July 19, 1949.  J. M. BENJAMIN  2,476,399

WEIGHING SCALE

Filed March 15, 1946

INVENTOR
JOEL MALVERN BENJAMIN
BY
Barr Borden & Fox
ATTORNEYS

Patented July 19, 1949

2,476,399

UNITED STATES PATENT OFFICE 2,476,399

WEIGHING SCALE

Joel Malvern Benjamin, Philadelphia, Pa.

Application March 15, 1946, Serial No. 654,678

4 Claims. (Cl. 265—70)

This invention relates to scales, and particularly to weighing scales for articles such as letters and the like, although not limited in its application to articles of this order of magnitude.

It is among the objects of this invention; to improve the art of scales; to provide a scale of a highly ornamental nature in the simulation of an animal, bird or fish or the like as an enhancement of the ornamental nature of the device; to provide a new and novel system of operation of scales; to provide scales which are free from springs and the like and which are so free from wear as to retain accuracy over long periods of use; to provide scales utilizing a shortening moment arm for balancing effects; to provide an accurate scale of extreme cheapness of manufacture; to provide a scale composed of only three parts, to wit, a balancing frame assembly, a weighing pan and a pivoted indicator. Other objects and advantages will become more apparent as the description proceeds.

In the accompanying drawings forming part of this description,

Figure 1:
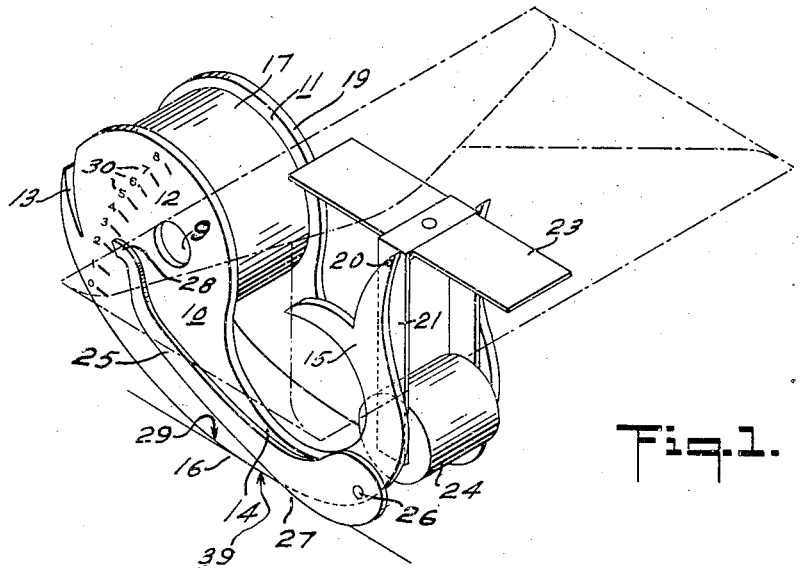
Fig. 1 represents a perspective of the scale according to an illustrative embodiment thereof, showing an article, the weight of which is to be determined, such as a letter, in dotted lines, and showing the parts of the scale relatively adjusted to give a reading of the weight of such article.
Figure 2:
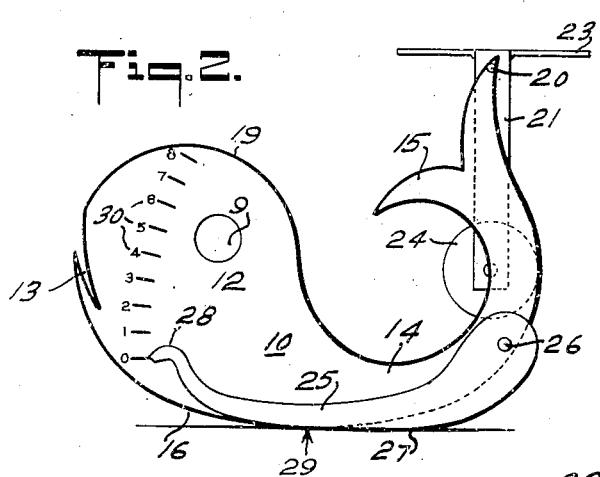
Fig. 2 represents a side elevation of the same in a condition of balanced rest with no weight on the pan.
Figure 3:
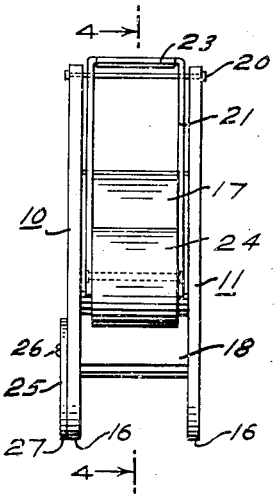
Fig. 3 represents an end elevation of the device of Fig. 2.
Figure 4:
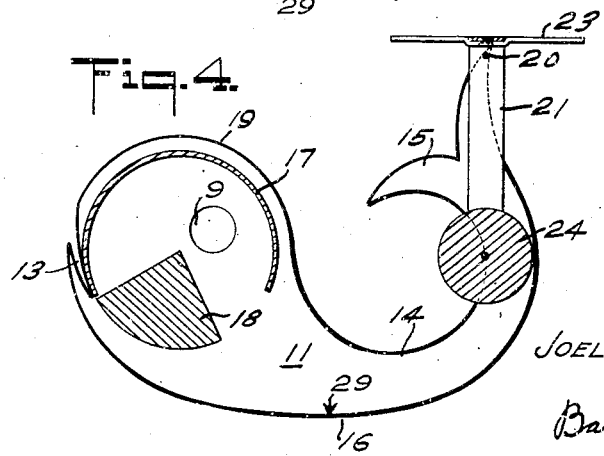
Fig. 4 represents a section taken on line 4—4 of Fig. 3.

It will be understood that the invention may take strictly utilitarian forms having no similitude to any other articles, but for general purposes the scale is preferably so disposed as in silhouette to represent birds, beasts, fish or the like, according to preference, and in the illustrative case given, represents a more or less conventionalized fish. The scale assembly is formed with a pair of spaced side plates 10 and 11, disposed in spaced preferably parallel relation and each having an enlarged rounded portion 12 of considerable vertical area to receive calibrations to be described, having a slot 13 in the edge simulating a conventionalized mouth of the fish at one end. The plates may each be provided with a suitably placed aperture 9 simulating a conventionalized eye of a fish. The enlarged head portions 12 taper into attenuated rearwardly extending body portions 14, respectively leading upwardly into upstanding flaring tail portions 15. The side plates are respectively provided with like lower curved rolling surface 16 upon which the respective spaced side plates and thus the assembly rests. The side plates 10 and 11 at the forward end are connected rigidly together, toward the upper portions by an arcuate sheet metal bridge member 17, of generally the same curvature as the upper edge 19 of the respective side plates 10 and 11, although preferably spaced radially inwardly therefrom for strength and appearance. The forward ends below the sheet metal connector or bridge member 17, engage and anchor a segmental block of metal 18, representing a weight concentration or mass at the forward end of the scale. Any effective concentration other than this block may be used. The tail ends 15 of the side plates, at their upper tip ends, are journalled to provide a pivotal axis 20 upon which a bracket 21 is pivotally suspended for free swinging. The bracket at the top forms a pan 23 to receive the weight to be measured, such as the illustrative letter disclosed or the like. The lower end of freely swinging bracket 21 carries a block of metal 24. A pointer arm 25 is pivoted at 26 to side plate 10 and has a lower curved cam surface 27 held by gravity to ride in contact with the fixed scale supporting surface. The free end 28 of the arm comprises a pointer which extends to the opposite side of the center of gravity of the assembly from the pivot 26 and sweeps the side of the enlarged end of the plate 10 in front of the arcuate series of graduations 30 which latter are calibrated for the different weights which may be disposed on the pan 23, and which pointer 28 rises as a function of the rearward rolling of the assembly pursuant to placing of weight on the pan as will be described.

It will be understood that as so far described the lower arcuate surfaces 16 of the side plates forming the supporting surface for the assembly will come to rest on a fulcrum point or transverse line 29, at the intersection of the flat scale supporting surface tangent to the curve 16, when the weight represented by the center of gravity of the mass at the enlarged end of the assembly, probably located somewhere in the block 18, on a moment of horizontal length from the vertical projection of this center of gravity to the fulcrum point or line 29 balances the moment formed of the center of gravity of the other end of the assembly, close to if not at the pivot 20, of a horizontal length from a vertical projection of the latter center of gravity to the same point or line of fulcrum contact 29. At this condition of rest when the forces form a couple, the pointer arm 25 with its curved lower surface resting on an area of scale-supporting surface has the pointer end 28 at its lower point in registration with the zero or datum calibration of "no weight" on the pan. This is the normal condition of the device when at rest and not in use.

When a weight, the value of which is to be determined or ascertained in terms of the calibrations 30, is added to the self-leveling pan 23, this adds to the mass at the rear end of the assembly and increases the moment on this side of the fulcrum line 29. The unbalance which immediately ensues causes the assembly to roll toward the rear, leaving the fulcrum point 29 and establishing a new fulcrum point 39 about which equilibrium is reestablished and the moment at the front end balances the rearward moment. During this rolling rearward motion of the assembly however, the relative upward pressure of the stationary support as the pivotal axis 26 is lowered toward the table with the unbalance, causes the pointer arm 25 to move upwardly sweeping across the series of calibrations 30 until balanced moments occur and the pointer then registers with the appropriate calibration 30 to measure the degree of unbalance as a function of the added weight on the pan 23.

It will be obvious that this form of invention disclosed is purely illustrative and many modifications thereof will occur to those skilled in the art.

The simplicity, cheapness and continuing accuracy of the device will be apparent.

I claim as my invention:

1. A scale comprising an assembly having a curved bottom to roll tangentially upon a fixed surface according to variation of the center of gravity of said assembly, weight means at opposite sides of said center of gravity to establish an initial condition of equilibrium of said assembly, one of said weight means including a weighing pan, a pointer pivoted to said assembly at the pan side of said center of gravity and terminating at the opposite side of said center of gravity in close proximity to said other weight means, said pointer having a cam surface resting by gravity upon said fixed surface, and weight measuring means for indicating the position of said pointer in a new condition of equilibrium caused by the weght of an object on said pan, whereby the weight of said object is determined.

2. A scale comprising an assembly having a curved bottom to roll tangentially upon a fixed surface according to variation of the center of gravity of said assembly, weight means at opposite sides of said center of gravity to establish an initial condition of equilibrium of said assembly, one of said weight means including a pendulum and weighing pan pivoted to said assembly, a pointer pivoted to said assembly at the pan side of said center of gravity and terminating at the opposite side of said center of gravity in close proximity to said other weight means, said pointer having a cam surface resting by gravity upon said fixed surface, and weight measuring means for indicating the position of said pointer in a new condition of equilibrium caused by the weight of an object on said pan, whereby the weight of said object is determined.

3. A scale comprising an assembly having a curved bottom to roll tangentially upon a fixed surface according to variation in the center of gravity of said assembly, weight means at opposite sides of said center of gravity to establish an initial condition of equilibrium of said assembly, one of said weight means including a pendulum and a weighing pan pivoted to said assembly, indicia graduated on the other weight means, and pointer cam means riding on said fixed surface and responsive to variations of said center of gravity caused by the weight of an object on said pan to indicate on said indicia the weight of said object.

4. A scale comprising an assembly formed of two spaced similarly contoured sides each having a curved bottom to roll tangentially upon a fixed surface according to variation of the center of gravity and terminating at one end in a head and at the other end in an upstanding tail, means between said heads to mount said sides in spaced relation, a weight carried by said head means, a pivot pin interconnecting said tail ends, a weighted pendulum member suspended from said pivot pin, a weighing pan carried by said member, said member and pan establishing an initial balanced condition of said assembly, and means including a pivoted cam-faced pointer riding on said fixed surface and responsive to variations of said center of gravity caused by the weight of an object on said pan to indicate as a function of the weight of said object.

JOEL MALVERN BENJAMIN.

REFERENCES CITED

The following references are of record in the file of this patent:

UNITED STATES PATENTS

| Number | Name | Date |
| --- | --- | --- |
| 107,182 | King | Sept. 6, 1870 |
| 1,185,634 | Cummer | June 6, 1916 |
| 1,641,596 | Mahloy | Sept. 6, 1927 |
| 2,383,408 | Morgan | Aug. 21, 1945 |